E. F. Hyde,
Railroad Switch,
Nº 32,518. Patented June 11, 1861.
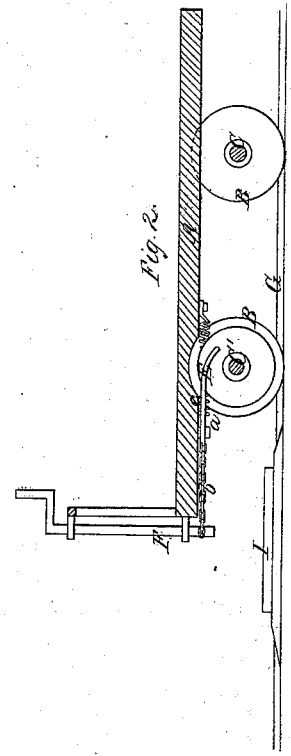
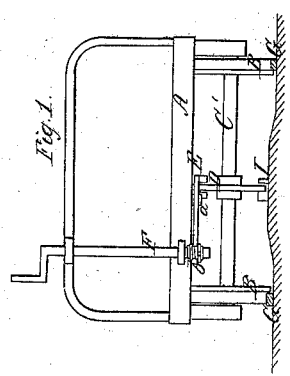
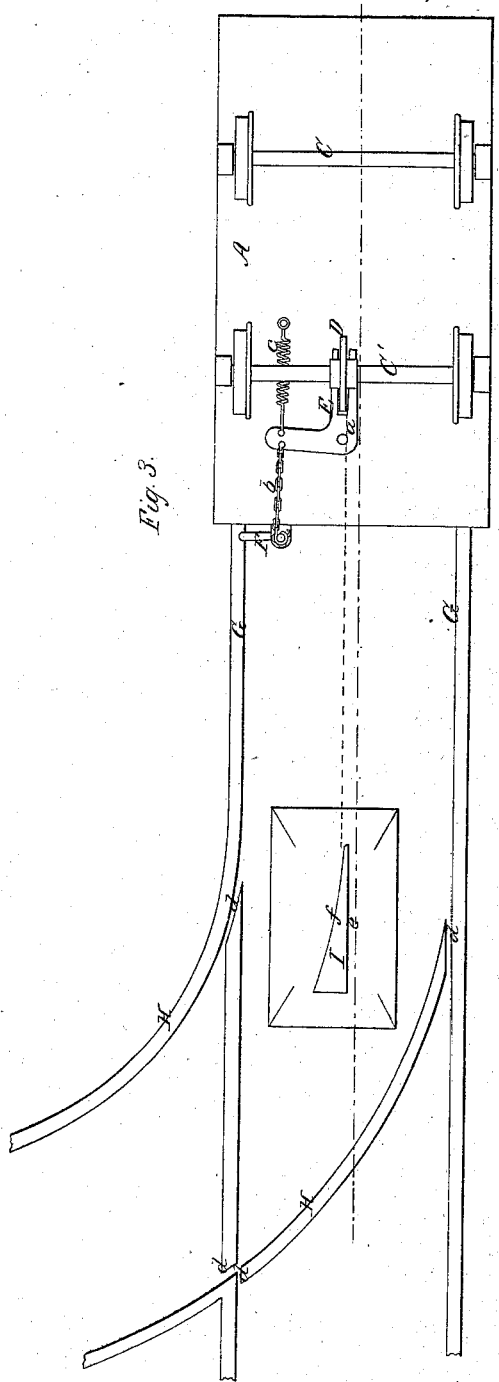
Witnesses:
James Laird
Lewis A. Tucker
Inventor:
Ezra F. Hyde

UNITED STATES PATENT OFFICE.

EZRA F. HYDE, OF BROOKLYN, NEW YORK.

IMPROVEMENT IN CITY RAILROADS.

Specification forming part of Letters Patent No. 32,518, dated June 11, 1861.

*To all whom it may concern:*

Be it known that I, EZRA F. HYDE, of Brooklyn, in the county of Kings and State of New York, have invented a new and useful Improvement in Railroads for Cities or those which are Designed for Horse-Cars; and I do hereby declare that the following is a full, clear, and exact description of the same, reference being had to the annexed drawings, making a part of this specification, in which—

Figure 1 is an end view of a car and a transverse section of the rails or track, showing my invention; Fig. 2, a side sectional view of the same, taken in the line $x\ x$, Fig. 3; Fig. 3, a plan or top view of the rails or track with an inverted plan of the car.

Similar letters of reference indicate corresponding parts in the several figures.

The object of this invention is to supersede the use of the ordinary switches and switchmen which are necessarily employed to adjust or operate them, so as to not only economize in labor, but also economize in the expense of the construction of the road at the turn-outs, as well as in keeping the same in proper repair.

To enable those skilled in the art to fully understand and construct my invention, I will proceed to describe it.

A represents the platform or bed of a car, and B the wheels, the axles C C' of which are fitted to the platform or bed in the usual way. On the axle C' of the platform there is placed loosely a wheel D, which is somewhat smaller in diameter than the wheels B. The upper part of the wheel D fits within the fork of a bent lever E, which is attached to the under side of the platform A by a fulcrum-pin $a$, and is connected by a chain $b$ with the lower end of an upright shaft F at the end of the platform. The end of the lever E has a spring $c$ attached to it opposite to the chain $b$. By turning the shaft F it will be seen that the lever E will be actuated and the wheel D moved on the axle; the spring $c$ acting against the pull of chain $b$.

G G represent the two rails of a direct railroad-track, and H H represent the curved rails of a turn-out or branch track. At the intersections of the direct and branch rails there are grooves or recesses $d$ to admit of the passing of the flanges of the wheels. (See Fig. 3.)

Between the direct rails G G, at their junction with the curved rails H H, there is secured a guide I. This guide is of metal, and it may be described as being a bar straight at one side or parallel with the direct rails G G, as shown at $e$, and curved at the opposite side corresponding with the curvature of the rails H H, as shown at $f$ in Fig. 3.

The operation is as follows: The spring $c$ is designed to keep the wheel D on the axle C' at a point in line with the straight side $e$ of the guide I, and if the lever E be not otherwise acted upon the car will pass the curved rails H H and be kept on the direct rails G G. In case it is desired to pass on the turn-out or branch rails H, the driver turns the shaft F and actuates the lever E, so that the wheel D will be turned in line with the curved side $f$ of the guide, as indicated by the dotted lines in Fig. 3, and the car will be thereby directed on the curved rails H. Thus by this simple arrangement all switches, and consequently switchmen, are avoided, as well as the expense attending the keeping of switches in proper repair.

I am aware that shifting-arms with wheels attached have before been employed for analogous purposes. I therefore disclaim the invention of such devices. Nor do I claim, broadly, the switching off of railroad-cars by the use of arms and wheels attached to the car. In nearly all other devices for this purpose that I am acquainted with the wheel which operates on the guide is attached to or carried in swinging arms, said arms being attached to the car. Consequently the rise and fall of the car upon the springs will lift the guide-wheel from the track and render its operation unreliable.

In my improvement the wheel is arranged to slide laterally upon the axle. Consequently its position is never affected by the springs, and all swinging arms or other supports are dispensed with.

Having thus described my invention, what I claim as new, and desire to secure by Letters Patent, is—

The arrangement of the sliding adjustable wheel D with the axle C' and lever E, as and for the purpose herein shown and described.

EZRA F. HYDE.

Witnesses:
JAMES LAIRD,
LEWIS A. TUCKER.